United States Patent Office 2,868,686
Patented Jan. 13, 1959

2,868,686

IODINE BROMINE PREPARATIONS FOR CONTROLLING MICROORGANISMS

Morris V. Shelanski, Atlantic City, N. J., and Murray W. Winicov, Philadelphia, Pa., assignors to West Laboratories, Inc., Long Island City, N. Y., a corporation of New York No Drawing. Application November 19, 1956
Serial No. 622,783

13 Claims. (Cl. 167—17)

This invention relates to preparations for controlling microorganisms, particularly bacteria, fungi and molds. More particularly the invention relates to improved iodine compositions wherein iodine bromide is complexed with certain surface active agents. The present application is a continuation-in-part of our pending application Serial No. 283,983, filed April 23, 1952, now abandoned.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 part of iodine dissolve in 100 parts of water at 0° C. and 0.09566 part of iodine dissolve in 100 parts of water at 60° C.), it cannot be used in the form of an aqueous solution. A solution of iodine in the common water miscible solvents for iodine such as acetone, ethyl alcohol, methyl alcohol, glycols and glycerols, cannot be used effectively to control microorganisms because in water much of the iodine will be precipitated promptly and is lost in aqueous dilution of the solution without exercising its germicidal action. The addition of an iodine solution in a water immiscible solvent such as carbon tetrachloride, benzene and ether to water containing microorganisms does not result in control of the microorganisms because little of the iodine dissolves in the water, the amount thus dissolved being limited by the solubility of iodine in water which as above noted is very small.

It has been proposed to produce iodine complexes, i. e. to incorporate iodine in a surface active agent or detergent, referred to herein as an iodine carrier, which complexes when added to aqueous media gradually release the iodine as free iodine so that it is germicidally effective.

This invention is in the nature of an improvement on such complexes.

It is an object of this invention to provide iodine containing preparations which are effective to control microorganisms; in which preparations all of the iodine is effective as contrasted with prior known complexes in which only approximately ⅔ of the iodine is effective, which can be produced more economically than prior known complexes and in the use of which iodine which had formed iodides with microorganisms and thus destroyed the microorganisms is regenerated as free iodine which again becomes effective to destroy more microorganisms. Other objects and advantages of this invention will be apparent from the following detailed description thereof.

In accordance with the invention we have discovered that preparations of iodine bromide complexed with nonionic or anionic surface active iodine carriers in place of iodine alone exhibit markedly enhanced germicidal activity and performance. Furthermore, it has been found that this superiority when complexing with iodine bromide instead of iodine alone is applicable generally to complexes formed with all nonionic and anionic surface active agents which are themselves effective iodine carriers.

In this connection it is to be understood that as used hereinafter in the specification and claims the term "iodine carrier" means a water soluble surface active agent which has the capacity to dissolve and complex with elemental iodine and to carry the dissolved or complexed iodine into aqueous solution without precipitation or crystallization of iodine. It is generally considered that effective iodine carriers will dissolve and complex with at least about 10% of iodine (based on the weight of carrier), and dilute clearly in water, i. e. without precipitation or crystallization of iodine. The 10% is not to be understood as a fixed lower limit for iodine dissolving power of an iodine carrier. Many water soluble surface active agents, particularly among the anionics, which dissolve and complex with less than 10% by weight of iodine are nevertheless good "iodine carriers," some being specially adapted for germicidal uses where high wetting or penetrating power is desired. On the other hand some of the nonionic carriers will dissolve and complex with 25 to 30% or more of iodine, based on the weight of carrier.

The iodine bromide complexed with iodine carriers in our new preparations is preferably iodine monobromide, although we can also employ iodine tribromide or mixture of iodine monobromide and tribromide providing intermediate ratios of bromine to iodine. The preparations may contain from 0.1 to 30%, preferably 5 to 15%, by weight of iodine based on the weight of the iodine carrier, and from 0.1 to 20%, preferably 2 to 15%, by weight of bromine based on the weight of the iodine carrier.

The complexes of iodine and bromide and iodine carrier can be prepared directly by combining iodine bromide with the carrier, or indirectly by first complexing iodine with the carrier and then reacting liquid or gaseous bromine with the carrier-iodine complex to form in situ the iodine bromide-carrier complex. When the carrier is a liquid or a solid or semi-solid which can be liquefied by heating, the iodine bromide, or the iodine followed by the bromine, can be added to the carrier for complexing and mixed therewith at room temperature, or at the necessary elevated temperature, until the iodine bromide or the iodine and then the bromine is completely dissolved. In instances where the carrier is a solid which does not melt at reasonable temperatures, such carrier can be dissolved in water to form a concentrated aqueous solution and the iodine bromide, or iodine and then bromine, added to the aqueous solution to effect complexing.

The resulting complex of iodine bromide and iodine carrier can be utilized directly in preparing use dilutions in aqueous media containing iodine concentrations suitable for controlling microorganisms, i. e. from about 5 to 10 p. p. m. up to several hundred p. p. m. depending upon the intended use and quantity of microorganisms to be destroyed. Alternatively, the preparations may be partially diluted or extended with water or other solvent media, or with a water soluble solid extender which is inert to iodine, such as urea, to provide practical concentrates for distribution, which are in turn diluted to provide the final aqueous use solutions. Such concentrates can suitably contain from about 0.1 to 50% or more of the carrier-iodine bromide preparation having regard for convenience in packaging and intended dilution by the user in preparing use solutions.

When use solutions are applied to control microorganisms they release the iodine bromide gradually forming free iodine upon decomposition of the iodine bromide, which decomposition takes place readily as the iodine bromide is released. Such solutions are therefore most effective for controlling microorganisms.

The preparations of this invention have a number of surprising advantages over prior known iodine complexes and iodine containing compositions. Among the more important of these advantages are the following:

(1) In the case of iodine complexes heretofore known the iodine reacts with constituents which may be present, for example, the carrier for the iodine or other constituents in the aqueous medium to which the complex is added with formation of iodides which are ineffective to control microorganisms. As much as about one-third of the iodine may thus be lost insofar as any effective germicidal action is concerned. When employing iodine bromide preparations of this invention surprisingly such reaction, if it takes place, is substantially offset by an iodine regenerative action rendering the iodine again effective to control microorganisms.

(2) There is a synergistic action between the iodine bromide and the carrier which action improves the activity of the iodine from the standpoint of its ability to control microorganisms.

(3) Iodine bromide alone is dangerous in view of its toxicity. Also iodine bromide alone has a high vapor pressure causing a loss of the iodine bromide from the solvent in which it may be dissolved. Furthermore, iodine bromide is very reactive so that when applied it rapidly loses its bactericidal effectiveness due to reaction with other materials which may be present, rather than exercising its germicidal properties on microorganisms to effect their control. In combination with the iodine carrier a stabilized preparation results which when added to water, forms a solution of any desired concentration, and which solution gradually exerts its effectiveness in the control of microorganisms.

As previously mentioned our new iodine bromide-carrier complexes can be prepared using any nonionic or anionic surface active agents which are iodine carriers. In such iodine carriers surface activity is provided by a balance of hydrophilic and hydrophobic groupings. Typical hydrophobic groups include alkyl phenol, alkyl benzene, fatty acid, fatty alcohol, fatty acid ester, fatty amine and fatty acid amide groups; and typical hydrophilic groups include ethylene oxide polymers, propylene oxide polymers, sulfonic acid and sulfonate groups.

Examples of suitable anionic iodine carriers are alkyl aryl sulfonates in which the alkyl group has from 3 to 30, preferably 5 to 20 carbon atoms and the aryl group is phenyl or naphthyl. Alkyl aryl sodium sulfonate, potassium sulfonate, ammonium sulfonate, or sulphonic acid may be used. The expression "alkyl aryl sulfonates" is intended to include both the free acid and the ammonium and alkali metal salts.

Examples of nonionic iodine carriers include:

a. Alkylene oxide aryl condensates, preferably alkyl phenol ethylene oxide condensates in which the alkyl group contains from 6 to 18 carbon atoms and from 5 to 60 mols, preferably 5 to 30 mols, of ethylene oxide are condensed per mol of alkyl phenol; and the closely related methylene bis-compositions wherein two such condensates are joined at the benzene rings through a methylene group.

b. Fatty and rosin acid alkylene oxide (preferably ethylene oxide and propylene oxide) condensates in which the fatty or rosin acid contains preferably 12 to 20 carbon atoms, and from 4 to 60, preferably 5 to 30, mols of alkylene oxide is condensed per mol of aliphatic acid, including for example condensates of ethylene oxide with stearic acid, lauric acid, or the rosin acids.

c. Fatty and rosin alcohol alkylene oxide (preferably ethylene oxide and propylene oxide) condensates in which the fatty or rosin alcohol contains preferably 12 to 20, carbon atoms, and from 4 to 60, preferably 5 to 30, mols of alkylene oxide are condensed per mol of fatty alcohol, including for example condensates of ethylene oxide with cetyl alcohol or lauryl alcohol.

d. N,N-di-substituted fatty acid amides of the formula:

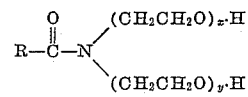

wherein R is an alkyl group containing preferably 11 to 17, carbon atoms, and $x+y$ is an integer from 2 to 50.

e. N,N-di-substituted fatty or rosin amines of the formula:

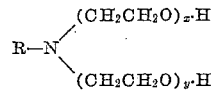

wherein R is an alkyl group containing preferably 12 to 20, carbon atoms and $x+y$ is an integer from 2 to 50.

f. Condensates of ethylene oxide with preformed polyoxypropylene glycol in which the polyoxypropylene glycol group has a molecular weight within the range of about 600 to 2500, preferably about 1000 to 2500, and the condensate contains 10 to 90% by weight of ethylene oxide. Compositions of this character are disclosed and claimed in United States Patent No. 2,674,619, dated April 6, 1954, issued to Wyandotte Chemicals Corporation, and defined therein as compounds according to the formula:

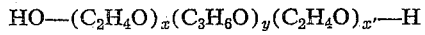

where $y$ equals at least 15; and $(C_2H_4O)_{x+x'}$ equals 20–90% of the total weight of the compound.

Complexes of such compounds with iodine as germicidal iodine preparations are disclosed and claimed in United States Patent No. 2,759,869, issued August 21, 1956, to applicants' assignee, West Laboratories, Inc.

Examples of typical carriers of this class include the following compositions sold by Wyandotte Chemicals Corporation under the designation "Pluronics."

"Pluronic L-62," or liquid condensate, the polyoxypropylene group of which has a molecular weight within the range of 1501 to 1800, and which contains from 20 to 30% by weight of ethylene oxide.

"Pluronic L-64," a liquid condensate, the polyoxypropylene group of which has a molecular weight of 1501 to 1800, and which contains from 40 to 50% by weight of ethylene oxide.

"Pluronic L-44," a liquid condensate, the polyoxypropylene group of which has a molecular weight of 1001 to 1200, and which contains 40 to 50% by weight of ethylene oxide.

"Pluronic F-68," a solid condensate, the polyoxypropylene group of which has a molecular weight of 1501 to 1800, and which contains from 80 to 90% by weight of ethylene oxide.

In preparing complexes of iodine bromide with anionic and nonionic iodine carriers the procedure of forming iodine bromide in situ as above described is particularly advantageous for a large scale operation since it avoids the need for handling iodine bromide per se and it also facilitates the addition of varying amounts of bromine so that the resulting complex may in fact be a complex of iodine monobromide, iodine tribromide, or mixtures thereof.

The following examples will demonstrate typical iodine bromide-carrier complexes in accordance with our invention, but it is to be understood that these examples are given by way of illustration and not of limitation.

*Example I*

An iodine bromide-carrier complex is prepared by mixing together at room temperature 12.8 parts by weight of iodine monobromide and 77.2 parts by weight of lauric acid ethylene oxide condensate containing about 10 mols of ethylene oxide per mol of lauric acid.

*Example II*

An iodine bromide-carrier complex is prepared by first dissolving 98.5 parts by weight of sodium mixed dibutyl naphthyl sulfonate in sufficient water to form a concentrated solution and mixing into such concentrated solution 1.5 parts of iodine tribromide.

Example III

An iodine bromide-carrier complex is prepared by melting 84 parts by weight of ethylene oxide stearic acid condensate containing 20 mols of ethylene oxide per mol of stearic acid and dissolving therein 16 parts by weight of iodine monobromide.

Example IV

An iodine bromide-carrier complex is prepared by melting 93 parts by weight of "Pluronic F-68" and dissolving therein 7 parts of iodine monobromide.

Example V

An iodine bromide-carrier complex is prepared by dissolving in a minimum amount of water 95 parts by weight of alkyl benzene sodium sulfonate in which the alkyl substituents are $C_{12}$ to $C_{18}$ groups, dissolving therein 3 parts by weight of iodine, supplied as iodine crystals, and then mixing 2 parts by weight of liquid bromine with the solution. Enough bromine is thus added to produce a complex containing iodine monobromide.

The production of iodine bromide in situ as described in Example V can be employed in preparing the complexes of Examples I to IV, and conversely the iodine bromide-carrier complex of Example V can be prepared directly complexing iodine monobromide with the alkyl benzene sodium sulfonate.

The following example is presented to show comparative stability characteristics of a number of our typical iodine bromide-carrier complexes. For the sake of clarity and brevity this example is presented in tabular form:

Example VI

Complexes of iodine bromide with carrier were prepared using the following carriers:

a. Alkyl ($C_{12}$–$C_{18}$) benzene sodium sulfonate as a concentrate containing about 8% water.

b. Methylene bis (isooctyl phenol ethylene oxide) condensate containing about 20 mols of ethylene oxide per mol of methylene bis (isooctyl phenol).

c. Polyethylene glycol mono laurate, containing about 10 mols of ethylene oxide per mol of lauric acid.

d. Lauryl alcohol condensed with 10 mols of ethylene oxide.

e. Hydrogenated tallow amide condensed with ethylene oxide to form an N,N-di-poly-oxyethylene substituted amide containing about 15 mols of ethylene oxide and having a molecular weight of about 938.

f. Stearyl amine condensed with ethylene oxide to form an N,N-di-polyoxyethylene substituted amine containing about 15 mols of ethylene oxide and having a molecular weight of about 944, as the phosphoric acid salt.

g. Nonyl phenol-ethylene oxide condensate containing 8 to 9 mols of ethylene oxide per mol of nonyl phenol.

h. Condensate of ethylene oxide with preformed polyoxypropylene in which the polyoxypropylene group has a molecular weight of 1501 to 1800, and containing 10 to 30% by weight of ethylene oxide (Pluronic L–62).

In preparing iodine and iodine bromide complexes the carriers were heated to about 50° C. to fluidize the carrier and accelerate the dissolving and complexing of halogen. In the case of carrier (a) the carrier was first dissolved in water to form a concentrated solution to which iodine and the bromine was added. In the case of carrier (f) the heating was somewhat higher than 50° C., sufficient to melt the carrier.

In each instance the carrier was first complexed with iodine, a portion of the iodine complex retained for testing, and the remainder of the iodine complex treated with bromine to form the iodine bromide-carrier complex. In the following tabulation the amounts of iodine and bromine employed in each instance are expressed in percent by weight based upon the weight of iodine bromide complex. Since later evaluation is based on titration with 0.01 n sodium thiosulfate, which titrates with available iodine and bromine, we have included in the tabulation values for total added halogen calculated as iodine (each part by weight of bromine being equivalent in titration to about 1.6 parts by weight of iodine).

The carrier-iodine complexes were titrated for available iodine (prior to addition of bromine). The carrier-iodine bromide complexes were titrated after three days, one week, and two weeks of standing at room temperature (in sealed containers) to determine the available iodine equivalent of the total available halogen. The results of these titrations are included in the following tabulation:

| Carrier | Percent I | Percent Br | Total Percent Halogen Calc'd as I | Percent Halogen as Iodine (by Titration) in complex with— | | | |
|---|---|---|---|---|---|---|---|
| | | | | I | 1 Br | | |
| | | | | | 3 day | 1 wk. | 2 wk. |
| a | [1] 6.4 | 8.6 | 15–20 | | 10.1 | 9.9 | |
| b | 8.6 | 5.4 | 17.1 | 7.1 | 13.1 | 10.6 | 10.3 |
| c | 8.6 | 5.4 | 17.1 | 5.7 | 13.1 | 10.6 | 10.3 |
| d | 8.6 | 5.4 | 17.1 | 8.2 | 16.3 | 14.1 | 14.0 |
| e | 8.6 | 5.4 | 17.1 | 7.1 | 13.6 | 12.6 | 12.6 |
| f | 7.3 | 4.6 | 14.6 | 4.4 | 7.2 | 6.7 | 6.7 |
| g | 12.7 | 5.9 | 22.0 | 9.7 | 14.3 | 14.4 | 14.6 |
| h | 15.0 | 5.9 | 24.3 | 10.9 | 16.7 | 16.5 | 16.8 |

[1] In preparing complex (a) the initial percent of complexed iodine was not accurately determined and the amount 6.4 is an approximation.

The data in the foregoing tabulation supports the following significant observations:

a. Initial complexing with iodine results in a permanent binding or reaction wiht part of the iodine so that the amount of available (and germacidally useful) iodine, as determined by titration, is somewhat less than the amount of iodine originally added.

b. Titration of the iodide bromide complexes, even after a two week standing period shows available iodine equivalent in most instances substantially greater than the amount of iodine originally employed.

c. The similarity between the one week and two week titration values indicates that the complexes have reached approximate stability conditions with the indicated amounts of iodine (equivalent) available for germicidal purposes.

Germicidal performance of our new iodine bromide-carrier complexes can be evaluated by the germicidal capacity test appearing in USDA "Official Methods of Analysis of the Association of Official Agricultural Chemists" (8th ed., pages 93–94) for determination of "available chlorine germicidal equivalent concentration."

By way of illustration compositions as disclosed in Example I (here abbrieviated as P. E. G.-iodine bromide complex) and in Example IV (Pluronic F-68–iodine bromide complex) have been prepared in use dilutions containing 163 p. p. m. of iodine bromide. Complexes of the same carriers with iodine alone and with bromine alone have been prepared in use dilutions containing respectively 100 p. p. m. of iodine and 63 p. p. m. of bromine. (Based on atomic weights of 126.92 for iodine and 79.92 for bromine, approximately 100 parts of iodine and 63 parts of bromine form 163 parts of iodine monobromide).

When the use dilutions of the iodine bromide, iodine, and bromine-carrier complexes above mentioned are tested for germicidal capacity to determine sterility end point (100% kill) in one minute contact time by addition of successive increments of test culture, the results are as follows:

AOAC "CAPACITY TEST"

[(20° C., sterility end point) (1 minute contact time).]

| Germicide Tested | Halogen Concentration, p. p. m. | No. of Increments of Test Culture |
| --- | --- | --- |
| P. E. G. Br$_2$ | 63 | 1 |
| P. E. G. I$_2$ | 100 | 16 |
| P. E. G. I Br | 163 | 26 |
| Pluronic F-68-Br$_2$ | 63 | 1 |
| Pluronic F-68-I$_2$ | 100 | 15 |
| Pluronic F-68-I Br | 163 | 24 |

It is evident from the foregoing tabulation that complexes of iodine bromide plus carrier have germicidal capacity which is distinctly superior to the germicidal capacity of either iodine individually or bromine individually with the carrier, and that the extent of superiority is out of all proportion to the additive germicidal capacity of bromine and iodine individually bound to the carrier. Indeed these results are believed to clearly indicate the existence of some synergistic action in the iodine bromide-carrier complexes.

When considering together the foregoing germicidal capacity results, which are typical of results with iodine bromide-carrier complexes generally, and the results in the previous tabulation showing the titratable iodine equivalent of a number of typical iodine bromide-carrier complexes, it will be apparent that the titratable iodine (equivalent) of the iodine bromide-carrier complexes must have germicidal capacity far in excess of the respective iodine-carrier complexes prior to addition of bromine.

Iodine bromide-carrier complexes such as disclosed in the foregoing examples can be readily diluted with water to provide use solutions having the desired concentration of iodine bromide for particular microorganism control problems. Such use solutions when applied in the control of microorganisms gradually release iodine bromide which decomposes to form free iodine which is effective to combat microorganisms. As with previously available iodine carrier complexes germicidal activity is further enhanced if use solutions of our iodine bromide-carrier complexes are at a moderatly acid pH, and for this purpose suitable amounts of mineral acid i. e. hydrochloric acid, phosphoric acid or the like, are preferably included in formulations as distributed to provide the desired pH on dilution.

Use solutions of our complexes may be employed to combat microorganisms domestically and industrially, and are particularly useful industrially. For example, such solutions may be applied to products such as paper in the course of manufacture to control mold and fungi. They may be used for cleaning surfaces to insure sanitary conditions, e. g. for the cleaning of floors, walks, sinks, bowls, and other surfaces, as a rinse for dishes, kitchen utensils and other apparatus, as a germicidal composition, and as a constituent of detergent and cleansing compositions.

As a further adaptation of our invention it is to be understood that germicidal activity of preformed complexes of iodine with anionic or nonionic carriers can be enhanced by adding to such preformed iodine-carrier complexes bromine in amounts to form in situ iodine bromide of a composition ranging from iodine monobromide to iodine tribromide. Particularly in some large scale industrial uses such formation of the iodine bromide complex from a preformed iodine complex might advantageously be carried out in a continuous or semi-continuous manner in synchronism with actual use of the iodine bromide complex in the control of microorganisms.

It should also be pointed out that iodine bromide-carrier complexes containing less than enough bromine to form iodine monobromide with all of the iodine present are within the scope of our invention and have advantages over complexes containing only iodine and carrier. Any appreciable amount of bromine combined with an iodine-carrier complex enhances the germicidal performance of the complex. In addition, from the standpoint of procedure in making germicidal iodine-carrier complexes, substantial savings in time and heat energy, and substantial reduction in iodine loss through vaporization, can be realized by mixing iodine crystals with enough bromine to dissolve the crystals and form a liquid iodine bromine composition. Such liquid composition will dissolve in anionic and nonionic iodine carriers much more readily than iodine crystals, thus permitting use of lower temperatures and shorter mixing times in the preparation of germicidal complexes.

Various changes and modifications in the foregoing compositions and methods will occur to those skilled in the art, and to the extent that such changes and modifications are embraced by the appended claims, it is to be understood that they constitute part of our invention.

We claim:

1. A composition for the control of micro-organisms comprising a complex of iodine bromide with a surface active agent selected from the group consisting of anionic alkyl phenyl sulfonates and alkyl naphthyl sulfonates wherein the alkyl group has from 3 to 30 carbon atoms and nonionic polyoxyalkylene condensates, said complex containing 0.1 to 30% of iodine and 0.1 to 20% of bromine based upon the weight of said surface active gent.

2. A composition for the control of micro-organisms comprising an complex of iodine bromide with a surface active agent selected from the group consisting of anionic alkyl phenyl sulfonates and alkyl naphthyl sulfonates wherein the alkyl group has from 3 to 30 carbon atoms and nonionic polyoxyalkylene condensates, said complex containing 0.1 to 30% of iodine and 0.1 to 20% of bromine based upon the weight of said surface active agent, and the proportion of bromine to iodine in said complex being within the range from iodine monobromide to iodine tribromide.

3. A composition for the control of micro-organisms as defined in claim 1 wherein said complex is associated with a water miscible extender inert to iodine, forming a concentrate adapted for dilution with water to provide a use solution of said complex.

4. A composition for the control of micro-organisms comprising a complex of iodine bromide with an anionic surface active agent selected from the group consisting of alkyl phenyl sulfonates and alkyl naphthyl sulfonates wherein the alkyl group has from 3 to 30 carbon atoms, said complex containing 0.1 to 30% of iodine and 0.1 to 20% of bromine based on the weight of said surface active agent.

5. A composition for the control of micro-organisms comprising a complex of iodine bromide with a surface active agent which is a nonionic polyoxyalkylene condensate, said complex containing 0.1 to 30% of iodine and 0.1 to 20% of bromine based upon the weight of said surface active agent.

6. A composition as defined in claim 5 wherein the surface active agent is selected from the group consisting of alkyl phenol ethylene oxide condensates wherein the alkyl group contains 6 to 18 carbon atoms and from 5 to 60 mols of ethylene oxide are condensed per mol of alkyl phenol, and methylene bis derivatives of such condensates.

7. A composition as defined in claim 5 wherein the surface active agent is a condensate of an alkylene oxide selected from the group consisting of ethylene oxide and propylene oxide with a compound selected from the group consisting of fatty and rosin acids, fatty and rosin alcohols, fatty and rosin amines, and fatty acid amides containing 12 to 20 carbon atoms, and 4 to 60 mols of alkylene oxide are condensed per mol of said compound.

8. A composition as defined in claim 5 wherein the surface active agent is a condensate of ethylene oxide with preformed polyoxypropylene glycol having the formula $HO-(C_2H_4O)_x(C_3H_6O)_y(C_2H_4O)_{x'}-H$ wherein $y$ equals at least 15 and $(C_2H_4O)_{x+x'}$ equals 20 to 90% of the total weight of the condensate.

9. The process for preparing a complex of iodine bromide with a surface active agent selected from the group consisting of anionic alkyl phenyl sulfonates and alkyl naphthyl sulfonates wherein the alkyl group has from 3 to 30 carbon atoms and nonionic polyoxyalkylene condensates, that comprise dissolving in said surface active agent an amount of iodine equivalent to from 0.1 to 30% by weight based on the weight of said surface active agent, and thereafter dissolving therein from 0.1 to 20% by weight of bromine.

10. The process as defined in claim 9 wherein iodine and bromine are dissolved in said carrier in proportions within the range to form from iodine monobromide to iodine tribromide.

11. The process as defined in claim 9 wherein iodine and bromine are dissolved in said surface active agent in approximately the proportions to form iodine mono-bromide.

12. The process for enhancing the germicidal activity of an iodine preparation which is a complex of iodine with a surface active agent selected from the group consisting of anionic alkyl phenyl sulfonates and alkyl naphthyl sulfonates wherein the alkyl group has from 3 to 30 carbon atoms and nonionic polyoxyalkylene condensates, that comprises dissolving in said preparation a quantity of bromine sufficient to convert at least part of the complexed iodine to iodine bromide, the maximum amount of bromine thus dissolved being the amount required to convert substantially all of the complexed iodine to iodine tri-bromide.

13. In compositions for the control of micro-organisms which are complexes of iodine with nonionic and anionic surface active agents, the improvement that comprises substituting for the free iodine in such complexes iodine bromide in an amount to provide 0.1 to 30% of iodine and 0.1 to 20% of bromine based on the weight of said surface active agent, with the proportion of bromine to iodine being within the range from iodine mono-bromide to iodine tri-bromide.

References Cited in the file of this patent

UNITED STATES PATENTS

| | | |
|---|---|---|
| 1,970,578 | Schoeller | Aug. 21, 1934 |
| 2,077,298 | Zelger | Apr. 13, 1937 |
| 2,263,948 | Halvorson | Nov. 25, 1941 |
| 2,759,869 | Sutton | Aug. 21, 1956 |

OTHER REFERENCES

West: J. Chem. Physics, vol. 15, p. 689 (1947).
Chem. and Eng. News, Feb. 19, 1951, p. 664.